(12) United States Patent
Zielinski et al.

(10) Patent No.: US 10,697,701 B2
(45) Date of Patent: Jun. 30, 2020

(54) METHOD AND APPARATUS TO PREVENT ELECTRONIC DEVICE SCREEN DAMAGE

(71) Applicant: REVIVE ELECTRONICS, LLC, Carmel, IN (US)

(72) Inventors: Reuben Quincey Zielinski, Fishers, IN (US); James M. Shrake, Anderson, IN (US)

(73) Assignee: Revive Electronics, LLC, Carmel, IN (US)

( * ) Notice: Subject to any disclaimer, the term of this patent is extended or adjusted under 35 U.S.C. 154(b) by 0 days.

(21) Appl. No.: 15/799,110

(22) Filed: Oct. 31, 2017

(65) Prior Publication Data

US 2019/0390902 A1 Dec. 26, 2019

(51) Int. Cl.
*F26B 5/04* (2006.01)
*F26B 25/00* (2006.01)
*F26B 25/08* (2006.01)

(52) U.S. Cl.
CPC ............. *F26B 5/04* (2013.01); *F26B 25/008* (2013.01); *F26B 25/08* (2013.01)

(58) Field of Classification Search
CPC .......... F26B 5/04; F26B 25/008; F26B 25/08; H04M 1/185
See application file for complete search history.

(56) References Cited

U.S. PATENT DOCUMENTS

| 6,266,123 | B1 | 7/2001 | Maejima et al. |
| 9,746,241 | B2 * | 8/2017 | Zielinski ................ F26B 5/04 |
| 2001/0040667 | A1 | 11/2001 | Sasaki |
| 2002/0047587 | A1 | 4/2002 | Lee et al. |
| 2008/0055235 | A1 | 3/2008 | Tanaka |
| 2013/0294017 | A1 | 11/2013 | Ota |
| 2019/0031423 | A1 * | 1/2019 | De La Torre Barreiro ................ F26B 5/04 |

OTHER PUBLICATIONS

Written Opinion of the International Searching Authority dated Feb. 25, 2019 in connection with International Application No. PCT/US2018/058492, 4 pages.
International Search Report dated Feb. 25, 2019 in connection with International Application No. PCT/US2018/058492, 3 pages.

* cited by examiner

*Primary Examiner* — Jessica Yuen
(74) *Attorney, Agent, or Firm* — Baker & McKenzie LLP

(57) ABSTRACT

This invention relates generally to a multi-function apparatus that is especially suited for the prevention of personal electronic device screen damage during vacuum drying of the device. The apparatus utilizes injection molded plastic that incorporates a sealing ring that seals itself onto a display. This sealing under vacuum pressure substantially increases the screen or display stiffness and prevents any deflection caused by sudden re-pressurization of air.

23 Claims, 5 Drawing Sheets

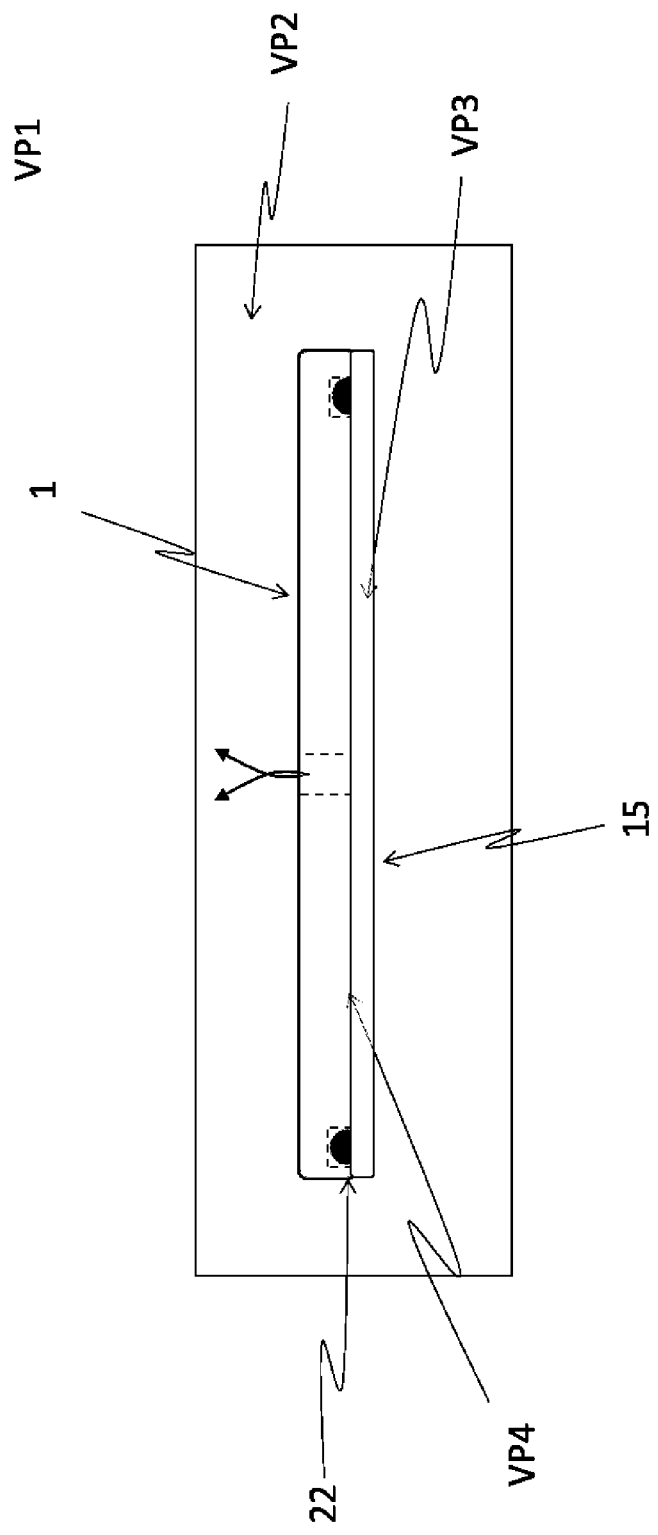

METHOD AND APPARATUS TO PREVENT ELECTRONIC DEVICE SCREEN DAMAGE

TECHNICAL FIELD

This invention relates generally to a tool that is especially suited for preventing damage to delicate electronic device screens when being subjected to heat and negative pressure during a vacuum drying process. The tool is designed specifically for use with a smart device vacuum dryer which is utilized for water removal of consumers electronic devices which have been rendered inoperable after water intrusion. The invention utilizes simple concepts to ensure delicate smart device displays and screens remain undamaged after being subjected to increased temperatures and vacuum pressures.

BACKGROUND OF THE INVENTION

With the advent of vacuum dryers to remove moisture from portable electronics in the mobile device industry, it is common practice to first triage a portable electronic device rendered inoperable after unintended water intrusion.

Smart device manufacturers, in an attempt to fabricate the smart device to be water resistant, have utilized various design and manufacturing techniques to minimize if not eliminate water intrusion. These techniques include various types of cordless charging thus minimizing the electrical connections on the smart devices. Still other techniques used are very high bond (VHB) adhesives which are used to adhere the displays and screens to the body of the smart device. These techniques have been very effective in that they adhere to the IPC67 standards for water resistance.

Even though the smart devices have been designed and fabricated to be water resistant, consumers, on a daily basis, still have unintended water intrusion via toilets, washing machines, water activities, and the like. Some devices have been designed to interrupt the charging port therefore not allowing a user to charge the device post water intrusion. If the smart device has a low battery charge, the user must seek a drying service to remove the water or face electrical damage to the smart device once the water in the charging port has effectively evaporated.

Because the smart device is so well sealed, when the device is subjected to gentle heat and increased vacuum pressure in a drying chamber, the air which is sealed in the smart device has a greater pressure than the vacuum chamber and is effectively evacuated. This evacuation eventually stabilizes, leaving the inside of the smart device under a negative pressure. When the vacuum drying process stops and atmospheric pressure is re-introduced to the vacuum chamber, the smart device screen, being under extreme negative pressure, collapses inward, effectively compressing the smart device. This compression has a negative consequence on the delicate display often fabricated from OLED technology and thin walled glass.

SUMMARY OF THE INVENTION

In the conventional art of smart device vacuum drying, the only method possible to ensure little to no compressive forces are applied to the delicate displays and screens is to dismantle the smart device prior to subjecting the smart device to the vacuum pressure. This is highly undesirable because the consumer now is forced into a repair situation (e.g. screen removal) without the screen being previously damaged. This is both time consuming and risky due to the delicate nature of the displays and screens on newer, more sophisticated smart devices. Moreover, the entire design intent of smart device vacuum dryers is to remove water from unintended intrusions without disassembly.

It was realized by the inventors that a new type of apparatus and method was needed to prevent display and screen damage to smart devices being subjected to increased temperatures and vacuum pressures during vacuum drying.

Embodiments of the present invention relate to equipment and methods for providing a simple attachment to the smart device display or screen which prevents undue compressive forces on the display or screen.

In certain embodiments, interchangeable parts of an apparatus and method are used to accommodate a protective screen saver which take advantage of a rigid structure and sealing techniques to ensure the smart device display and or screen remain flat and supported under increased vacuum pressure.

DESCRIPTION OF THE DRAWINGS

Some of the figures shown herein may include dimensions or may have been created from scaled drawings. However, such dimensions, or the relative scaling within a figure, are by way of example only, and not to be construed as limiting the scope of this invention.

FIG. 5 is a view of an apparatus to prevent electronic device screen damage mated together with a smart electronic device inside a vacuum chamber as shown in FIG. 4, with vacuum chamber under negative pressure (vacuum).

DESCRIPTION OF THE ILLUSTRATED EMBODIMENTS

Figure 1:
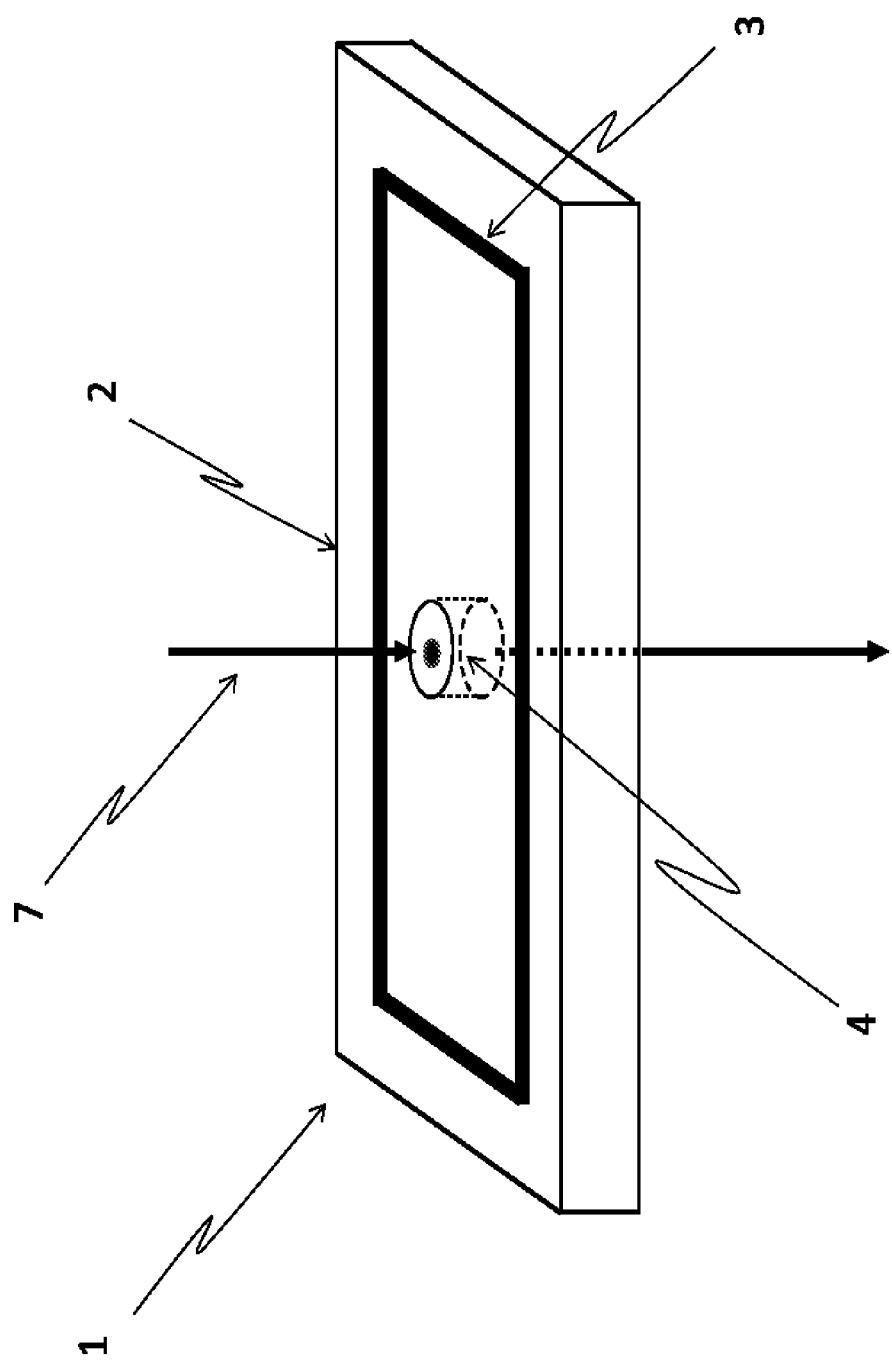
FIG. 1 is an isometric view of an apparatus to prevent electronic device screen damage according to one embodiment of the present disclosure.

For the purposes of promoting an understanding of the principles of the invention, reference is made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Referring first to FIG. 1, the apparatus to prevent electronic device screen damage 1 is shown with stiffening plate 2, vacuum seal ring 3, and vacuum pressure check valve 4. In one embodiment, stiffening plate 2 is fabricated from a suitable plastic that has a high yield strength (e.g. unbendable) or metal. Plastic is desirable for stiffening plate 2 because it can be injection molded with precise features in the design. In preferred embodiments, vacuum seal ring 3 is a standard o-ring that is fitted into a machined or molded-in groove on stiffening plate 2. In other preferred embodiments, the o-ring seal is seated approximately 75% into the molded-in seal groove with 25% of the o-ring being revealed. This allows for a tight seal mechanism with proper seal crush that does not flatten the o-ring seal during repeated use.

Vacuum check valve 4 is mounted into stiffening plate 2 in such a manner as to allow air or gas to pass through vacuum check valve 4 in the depicted air flow directional vector 7.

Figure 2:
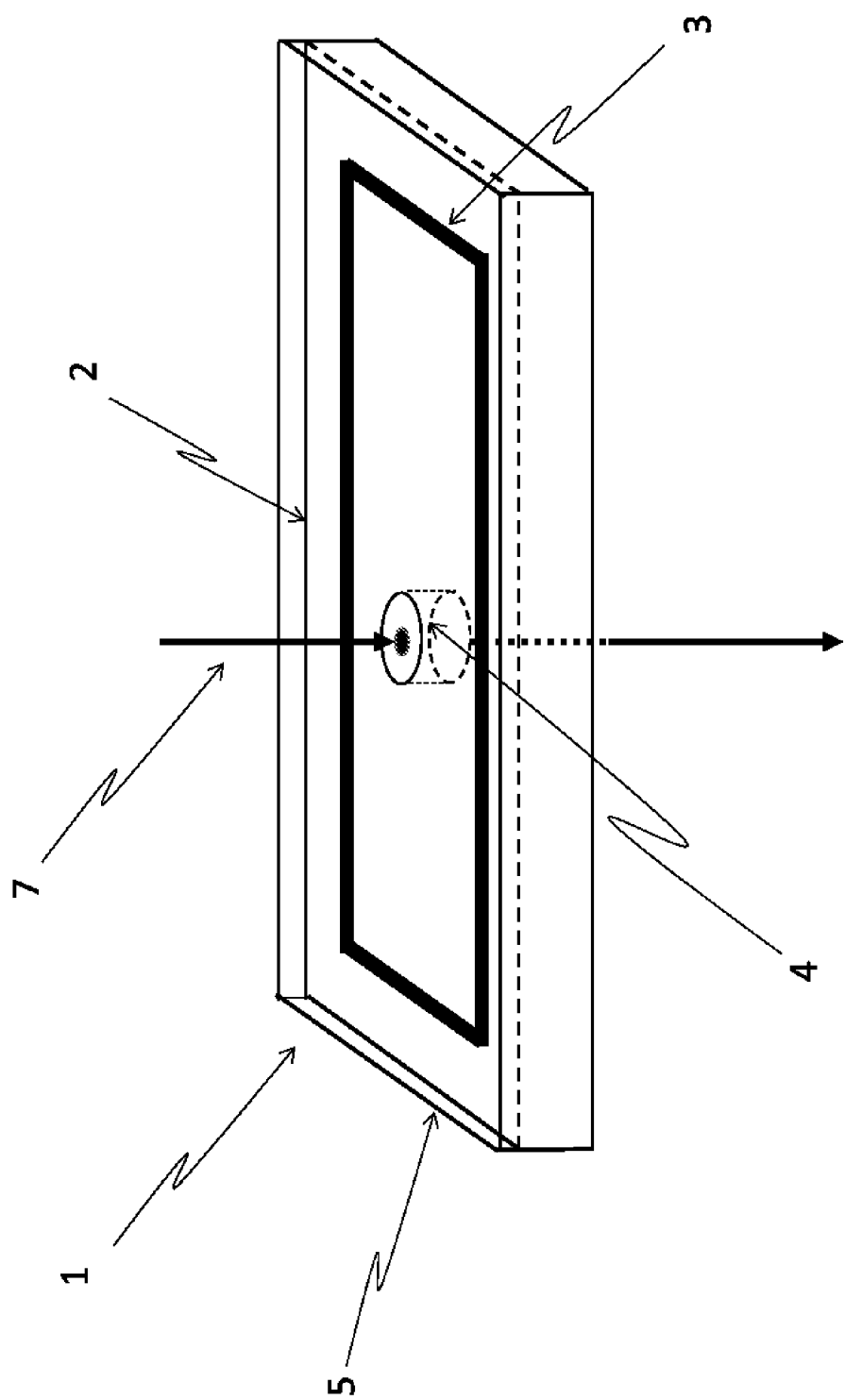
FIG. 2 is an isometric view of an apparatus to prevent electronic device screen damage according to another embodiment of the present disclosure.

Referring now to FIG. 2, another embodiment of the apparatus to prevent electronic device screen damage 1 is depicted with captivating and alignment feature 5 which is an integral part of stiffener plate 2. Captivating and alignment feature 5 is designed to envelope a smart electronic device and position the vacuum seal ring 3 onto display screen for maximum protection under vacuum. Although not shown, one skilled in the art would understand that injection molding of the apparatus to prevent electronic device screen damage 1 could be very thin walled plastic with vertical ribs in a lattice structure for rigidity and strength under vacuum.

Figure 3:
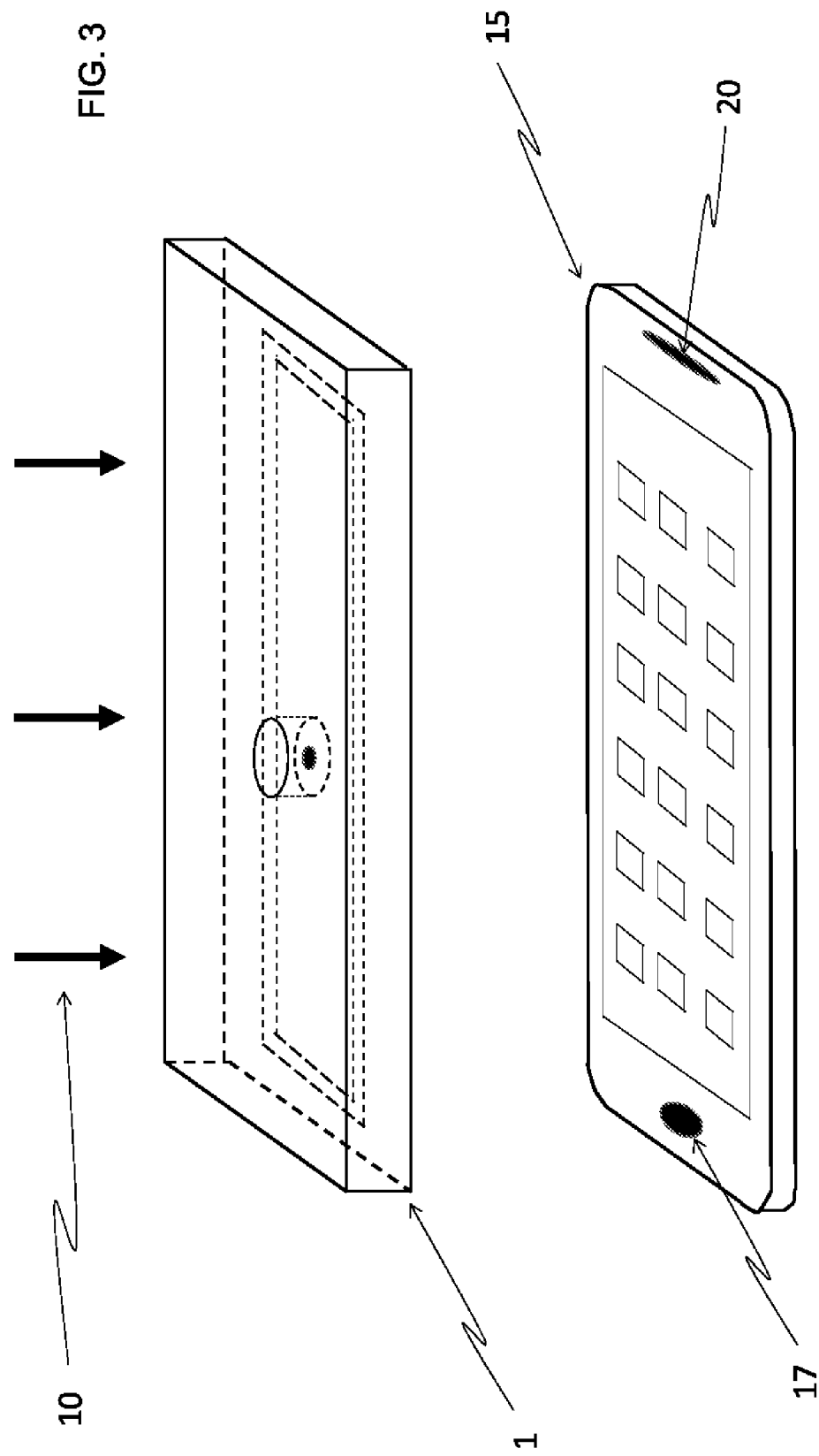
FIG. 3 is an isometric view of an apparatus to prevent electronic device screen damage together with a smart electronic device.

In some embodiments as shown in FIG. 3, the apparatus to prevent electronic device screen damage 1 is depicted being placed onto personal electronic device 15 with some force (e.g. placed under gravity) 10. Apparatus to prevent electronic device screen damage 1 is depicted flipped over, with vacuum seal ring 3 on the underside of stiffener plate 2 and aligned with personal electronic device 15 display side.

In preferred embodiments, vacuum seal ring 3 is designed into stiffener plate 2 and positioned onto personal electronic device 15 in such a manner to prevent vacuum seal ring 3 from touching personal electronic device 15 button feature 17 and speaker feature 20.

Figure 4:
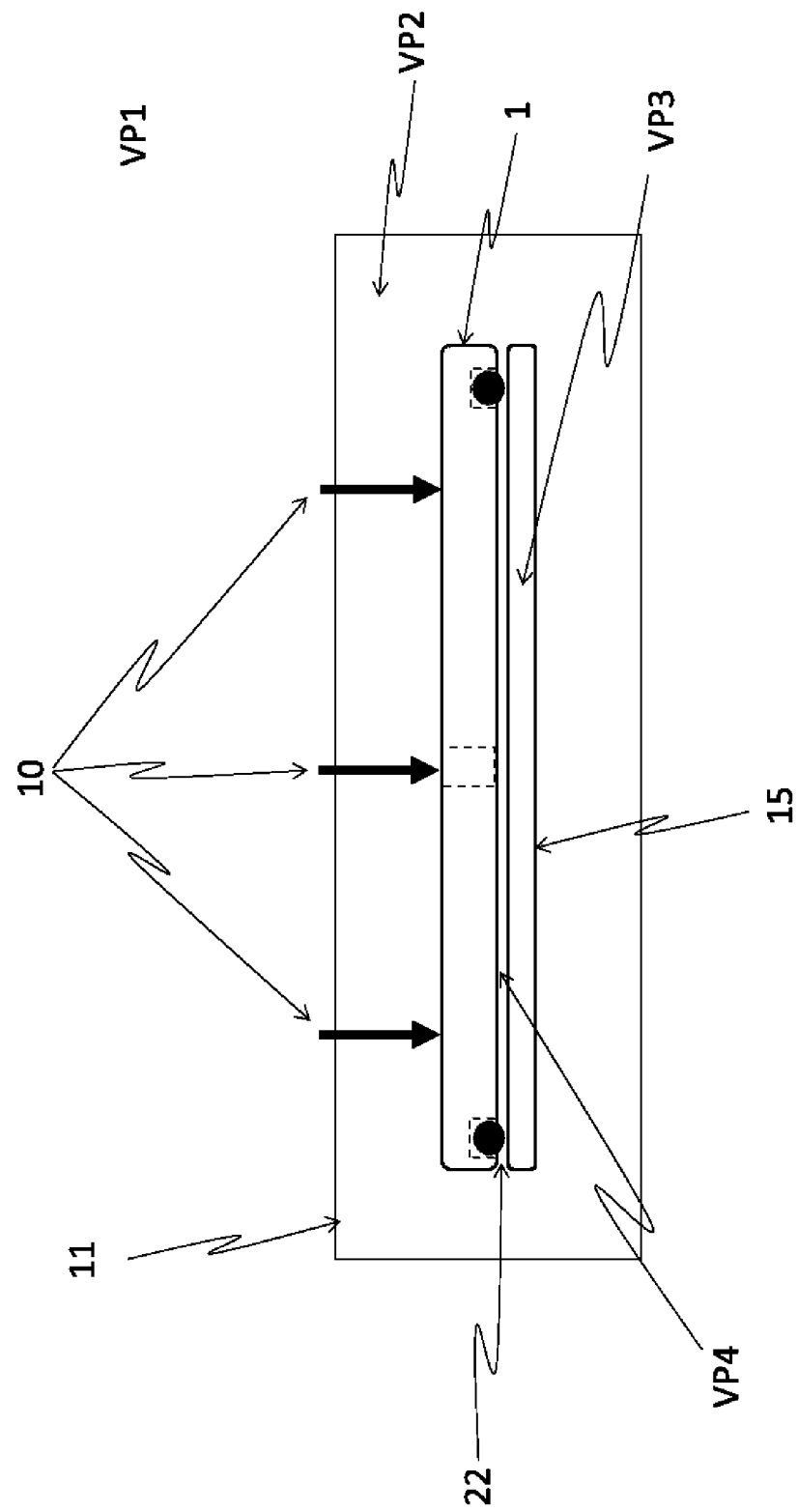
FIG. 4 is a view of an apparatus to prevent electronic device screen damage mated together with a smart electronic device inside a vacuum drying chamber.

Referring now to FIG. 4, the apparatus to prevent electronic device screen damage 1 is depicted inside vacuum drying chamber 11 and about to be placed on top of personal electronic device 15 with force 10. With no vacuum applied to vacuum drying chamber 11, atmospheric vacuum pressure VP1 is near equivalent to chamber vacuum pressure VP2 of vacuum drying chamber 11, and inside vacuum pressure VP3 of personal electronic device 15. Personal electronic device 15 and the apparatus to prevent electronic device screen damage 1 mating airspace VP4 is also at near equivalent vacuum pressure of VP1, VP2, and VP3.

In preferred embodiments, chamber vacuum pressure VP2 is at a negative pressure with respect to atmospheric vacuum pressure VP1. As chamber vacuum pressure VP2 increases negatively, the apparatus to prevent electronic device screen damage 1 allows mating airspace VP4 air to escape either under seal ring 3 or vacuum check valve 4 by virtue of mating airspace VP4 pressure being greater than chamber vacuum pressure VP2. This equilibration of air pressures continues until chamber vacuum pressure reaches the desired vacuum pressure. Near simultaneously, personal electronic device 15 inside vacuum pressure VP3 also reaches near chamber vacuum pressure VP2 by allowing air to escape from various connection ports and tiny orifices on personal electronic device 15.

As best shown in FIG. 5, some preferred embodiments are depicted with the apparatus to prevent electronic device screen damage 1 providing adequate screen protection during vacuum drying. Once the desired vacuum chamber pressure VP2 is met, and or the drying cycle is complete, the vacuum chamber pressure VP2 is vented to the atmospheric vacuum pressure VP1. This venting and sudden pressure change compresses the apparatus to prevent electronic device screen damage 1 by allowing higher pressure air in mating airspace VP4 to escape through vacuum check valve 4. This sudden equalization of pressures forces the apparatus to prevent electronic device screen damage 1 onto personal electronic device 15 surface under high vacuum within mating airspace VP4. Thus, the personal electronic device 15 display is protected by having a solid block, planar to the display and adhered under full vacuum.

We claim the following:

1. An apparatus to prevent damage of a display screen of an electronic device during a drying operation for removing moisture from the electronic device, the apparatus comprising:
   a block for placing onto the display screen of the electronic device during the drying operation for removing moisture from the electronic device placed in a chamber such that an evacuation pump connected to the chamber is used to reduce pressure in the chamber, wherein an airspace exists between the block and the display screen of the electronic device;
   a vacuum check valve comprised in the block; and
   a vacuum pressure sealing portion comprised in the block and at least partially in contact with the display screen of the electronic device.

2. The apparatus of claim 1, wherein when the evacuation pump is controlled to reduce the pressure in the chamber, air escapes from the airspace between the block and the display screen of the electronic device.

3. The apparatus of claim 2, wherein the air escapes from the airspace at least one of via the vacuum check valve or from under the vacuum pressure sealing portion.

4. The apparatus of claim 2, wherein the air escapes until a first pressure in the airspace substantially equals a second pressure in the chamber, and wherein the second pressure in the chamber is less than atmospheric pressure.

5. The apparatus of claim 2, wherein when the chamber is vented to atmospheric pressure following an interval of reduced pressure in the chamber, air escapes from the airspace via the vacuum check valve.

6. The apparatus of claim 2, wherein when the chamber is vented to atmospheric pressure following an interval of reduced pressure in the chamber, the apparatus compresses inwards.

7. The apparatus of claim 2, wherein the vacuum pressure sealing portion is aligned with the display screen of the electronic device.

8. The apparatus of claim 2, wherein the block comprises a stiffener plate.

9. The apparatus of claim 8, wherein the vacuum pressure sealing portion is located on an underside of the stiffener plate and is aligned with the display screen of the electronic device.

10. The apparatus of claim 2, wherein the block is a monolithic block.

11. The apparatus of claim 6, wherein the block is manufactured from plastic.

12. The apparatus of claim 11, wherein the plastic comprises injection-molded plastic.

13. The apparatus of claim 2, wherein at least one of the block or the sealing portion has first dimensions substantially similar to second dimensions of the electronic device or third dimensions of the display screen of the electronic device.

14. The apparatus of claim 2, wherein at least one of the block or the sealing portion has first dimensions at least slightly larger than second dimensions of the electronic device or third dimensions of the display screen of the electronic device.

15. The apparatus of claim 2, wherein at least one of the block or the sealing portion at least partially covers the display screen.

16. The apparatus of claim 2, wherein the vacuum pressure sealing component comprises a sealing ring.

17. The apparatus of claim 16, wherein the sealing ring is comprised of at least one of a seal gland channel or an o-ring.

18. The apparatus of claim 2, wherein the vacuum check valve is comprised near a center of the block.

19. The apparatus of claim 2, wherein the vacuum sealing portion does not contact a button or a speaker located on a face comprising the display screen of the mobile device.

20. The apparatus of claim 2, wherein the vacuum check valve is associated with a cracking pressure of at least 0.01 psi.

21. The apparatus of claim 2, wherein when the evacuation pump is controlled to reduce the pressure in the chamber, moist air escapes from at least one of a connection port or an orifice located in the electronic device.

22. The apparatus of claim 2, wherein when the chamber is vented to atmospheric pressure following an interval of reduced pressure in the chamber, the apparatus compresses inwards, thereby preventing the electronic device from substantially compressing inwards.

23. An apparatus to prevent damage of a display screen of an electronic device during a drying operation for removing moisture from the electronic device, the apparatus comprising:
- a block for placing onto the display screen of the electronic device during the drying operation for removing moisture from the electronic device placed in a chamber such that an evacuation pump connected to the chamber is used to reduce pressure in the chamber, wherein an airspace is present between the block and the display screen of the electronic device;
- a valve comprised in the block; and
- a vacuum pressure sealing portion comprised in the block and at least partially in contact with the display screen of the electronic device.

* * * * *